(12) United States Patent
Larsson

(10) Patent No.: US 10,465,822 B2
(45) Date of Patent: Nov. 5, 2019

(54) CONNECTION SYSTEM FOR SUBSEA PIPELINES

(71) Applicant: Aker Solutions AS, Lysaker (NO)

(72) Inventor: Johan Larsson, Årjäng (SE)

(73) Assignee: Aker Solutions AS, Lysaker (NO)

( * ) Notice: Subject to any disclaimer, the term of this patent is extended or adjusted under 35 U.S.C. 154(b) by 0 days.

(21) Appl. No.: 15/555,363

(22) PCT Filed: Feb. 29, 2016

(86) PCT No.: PCT/NO2016/050035
§ 371 (c)(1),
(2) Date: Sep. 1, 2017

(87) PCT Pub. No.: WO2016/140578
PCT Pub. Date: Sep. 9, 2016

(65) Prior Publication Data
US 2018/0066771 A1    Mar. 8, 2018

(30) Foreign Application Priority Data

Mar. 3, 2015   (NO) .................................... 20150285

(51) Int. Cl.
*E21B 43/01*    (2006.01)
*F16L 1/26*     (2006.01)
(Continued)

(52) U.S. Cl.
CPC .............. *F16L 1/26* (2013.01); *E21B 43/013* (2013.01); *F16L 1/16* (2013.01); *F16L 1/166* (2013.01)

(58) Field of Classification Search
CPC ............................... E21B 33/038; E21B 17/01
(Continued)

(56) References Cited

U.S. PATENT DOCUMENTS 3,459,442 A * 8/1969 Johnson .............. E21B 43/0107
285/27
3,492,027 A * 1/1970 Herring ................. E21B 33/038
285/18
(Continued)

FOREIGN PATENT DOCUMENTS

WO    WO-2008063080 A1    5/2008
WO    WO-2011043671 A1    4/2011

OTHER PUBLICATIONS

Løvås, Bjørn, "International Search Report," prepared for PCT/NO2016/050035, dated May 26, 2016, three pages.

*Primary Examiner* — Benjamin F Fiorello
*Assistant Examiner* — Edwin J Toledo-Duran
(74) *Attorney, Agent, or Firm* — Winstead PC

(57) ABSTRACT

The invention relates to a device for landing or retrieving a pipeline end on the seabed, the device comprising an outboard connecting part (2) being adapted to connect with the pipeline end and lowered from the surface towards a landing structure (3) on the seabed or alternatively lifted from the landing structure (3) on the seabed towards the sea surface. The invention is distinctive in that the outboard connecting part (2) comprising a pair of guide funnels (5a, 5b) adapted to engage with a pair of corresponding guideposts (4a, 4b) arranged on the landing structure (3), at least one fin (8) is attached to the outboard connecting part (2) and is adapted to bear against the landing structure (3), said pair of guide funnels (5a, 5b) are adapted to be in contact with the corresponding pair of guideposts (4a, 4b) when the outboard connecting part (2) is resting on the landing structure (3).

12 Claims, 13 Drawing Sheets

(51) Int. Cl.
*E21B 43/013* (2006.01)
*F16L 1/16* (2006.01)

(58) Field of Classification Search
USPC .............................. 166/341, 345, 379, 380
See application file for complete search history.

(56) References Cited

U.S. PATENT DOCUMENTS

| | | | | |
|---|---|---|---|---|
| 3,618,661 A * | 11/1971 | Peterman | ................ | E21B 41/10 166/343 |
| 3,724,061 A * | 4/1973 | Schipper | ................ | B63B 35/03 29/464 |
| 4,036,295 A * | 7/1977 | Kirkland | ................ | E21B 43/013 166/342 |
| 4,102,146 A * | 7/1978 | Dietrich | ................ | E21B 43/013 166/343 |
| 4,191,256 A * | 3/1980 | Croy | ................ | E21B 33/037 141/387 |
| 4,439,068 A * | 3/1984 | Pokladnik | ................ | E21B 41/10 166/338 |
| 4,525,101 A * | 6/1985 | Stevens | ................ | F16L 1/26 405/169 |
| 4,661,017 A * | 4/1987 | Wood | ................ | E21B 43/013 405/169 |
| 4,784,525 A * | 11/1988 | Francois | ................ | B63C 11/52 166/338 |
| 5,975,803 A * | 11/1999 | Mackinnon | ......... | E21B 43/0135 405/169 |
| 6,997,645 B2 * | 2/2006 | von Trepka | ................ | F16L 1/09 405/170 |
| 7,086,807 B2 * | 8/2006 | Mackinnon | ............ | E21B 41/04 166/347 |
| 7,402,000 B2 * | 7/2008 | Bastesen | ............ | E21B 43/0107 405/170 |
| 7,467,662 B2 * | 12/2008 | Smith | ................ | E21B 33/0385 166/343 |
| 8,057,126 B2 * | 11/2011 | Mogedal | .................. | F16L 1/26 405/170 |
| 8,267,179 B2 * | 9/2012 | Butcher | ............ | E21B 43/0107 166/341 |
| 8,794,336 B2 * | 8/2014 | Bekkevold | ................ | F16L 1/26 166/380 |
| 9,080,699 B2 * | 7/2015 | Larsson | ............ | E21B 43/0107 |
| 9,222,338 B2 * | 12/2015 | Larsson | ................ | F16L 1/26 |
| 9,228,677 B2 * | 1/2016 | Hestetun | ................ | E21B 43/013 |
| 2005/0063786 A1 | 3/2005 | Trepka et al. | | |
| 2007/0269270 A1 * | 11/2007 | Bastesen | ................ | F16L 1/20 405/170 |
| 2008/0014026 A1 * | 1/2008 | Routeau | ................ | E21B 43/0135 405/224.2 |
| 2011/0005764 A1 * | 1/2011 | Bekkevold | ................ | F16L 1/26 166/344 |
| 2012/0199358 A1 * | 8/2012 | Larsson | ................ | E21B 43/0107 166/341 |
| 2012/0201607 A1 * | 8/2012 | Larsson | ................ | E21B 43/0107 405/169 |
| 2014/0341656 A1 | 11/2014 | Lawson | | |

* cited by examiner

CONNECTION SYSTEM FOR SUBSEA PIPELINES

FIELD OF THE INVENTION

The present invention relates to a connector for use on the seabed together with a seabed fixed guidepost part, which parts together make up a landing structure for assistance during lowering of a component from the surface of the water or from a surface structure to obtain a focused landing of said component at a predetermined location or the retrieval of the connector from the seabed towards the sea surface. The releasable connector includes a downwardly facing fin (in the position of use) designed for abutting the seabed fixed guidepost part and prevent the connector from tipping when resting on the landing structure.

TECHNICAL BACKGROUND OF THE INVENTION

On subsea structures, for example manifold and valve structures, which are deployed on the seabed, piping is often arranged thereon. The piping comprise one or more pipes that terminate in open pipe subs, or porches, forming a connecting point. Each connecting point includes a stationary connecting part. Stationary in this context means relative to the subsea structure. The connecting point is later used for connection to an external pipe or subs.

There exist two principles for the connecting devices, either vertical or horizontal. For a horizontal connecting device, the connecting point projects horizontally out from the structure. In the North Sea, this solution has almost market control. Other places, like the Gulf of Mexico for example, the vertical solution is the most common one.

There are in principle three (or actually two) different forms for external connections to a structure:
  Direct connection between two structures: Here, a rigid pipe having a movable connecting part at each end will normally be used. This is usually termed a jumper. The jumper is manufactured based on measuring the relative position of the two connecting points.
  Connection between the end of a pipeline (rigid pipe) and a structure: It is almost impossible (at least very difficult) to connect a rigid pipeline directly to a structure preinstalled on the seabed. Thus, an intermediate piece of pipe, frequently termed a "spool", is provided between the pipeline and the structure. In order to connect the spool to the pipeline, the pipeline will be welded directly to a small structure including a connecting point. A spool is in principle like the jumper described above.
  Direct connection of a flexible pipeline or umbilical to a structure: In some cases it is chosen to use flexible pipes instead of rigid steel pipes. Such pipes can be compared to a big garden hose. Then it is not necessary with a spool or jumper between the end of the pipe and the structure. It is then not necessary to make precise measurements of the position on the connecting point on the structure. The present invention is related to the last principle.

Many solutions for accomplishing the direct connection of a flexible pipeline or umbilical to a structure are known.

The publication US 87943336 shows a tool for connecting an end of a first pipeline to an end of a second pipeline supported by a subsea structure and being provided by at least two guide elements. The guide elements are adapted to mate with guiding sections arranged on the connection tool. The tool is lowered directly down to the subsea structure to connect the pipeline ends. There is not disclosed in the a landing structure and a fin that is arranged between the guide funnels which provides an interaction and a positioning together with the guide funnels so that the connection device could rest before the subsea structure is lowered down. The invention allows therefore less accurate positioning of the pipeline end towards the seabed.

The publication WO2008063080 relates to connector means with a fixed connector part with a guidepost arranged at the seabed and a movable connector part for lowering a flexible pipeline to the connector part in the seabed. The movable connector having one funnel adapted to engage with the guidepost of the fixed structure when lowered into the seabed. The movable connector will be exposed to heave motion induced by the vessel. This will make it more difficult to enter the guidepost especially in deep waters where it is not possible to use guide wire for better control.

Publication WO2011043671 shows a similar connection device comprising a fixed connecting part, a movable connecting part and a landing structure. In this publication, there is no guiding post or funnel to position the movable connecting part in relation to the landing structure and the fixed connecting part.

Pipelines of steel are rigid and require that the connecting parts are positioned near each other approximately in a range between +/−100 mm. Flexible pipeline have more flexibility and could deal with a range of 10-20 m or more between the connecting parts. This means that the connecting parts do not need an exact positioning when they are lowered to the seabed.

In previous solutions, the inboard connecting part have to be installed on the seabed together with the landing structure before the outboard connecting part attached to the pipeline end is lowered to the seabed and landed on the seabed.

Objects of the Invention

It is an objective of the present invention to provide a system that allows for landing of the outboard connecting part which is attached to the flexible pipeline end prior to landing of the inboard connecting part which is attached to subsea installation or similar at the seabed. Several pipeline ends can therefore be lowered to the seabed prior to the connection to the subsea installation.

The installation is prevented from tilting when it is resting on the landing structure at the seabed before connected to the inboard connecting part.

It is another objective of the present invention to provide an installation that the invention makes it possible to guide and land a flexible connection in a wide range of installation angles. The seabed are some places uneven. The landing structure will follow the uneven surface. This resulting in that the guidepost having different angles on the seabed.

The shape of the funnels with a wide lower end makes the engaging between each of the funnel and guide easier.

It is yet another objective of the present invention to provide an installation where the construction is simple and robust.

It is yet another objective of the present invention to provide an installation where the maintenance or service exercises are considerably reduced.

It is yet another objective of the present invention to provide an installation where the parts deployed at the seabed are situated in a plane tilted relative to the plane of the seabed. The purpose of this is to reduce loads during and after connection of the connecting parts. The pipeline end having a substantially load. When this is It is also an objective of the present invention to provide an installation with two guideposts in order to guide the parts into connection with each other. The guideposts having different heights to make the connection with the funnels easier.

It is yet another objective of the present invention to provide an installation where the height of the prism-shaped parts of the funnels are shorter than the traditional funnels to make the mating with the guidepost easier.

It is yet another objective of the present invention to provide a dampening of the connection device when mating with the landing structure.

SUMMARY OF THE INVENTION

The invention relates to a device for landing or retrieving a pipeline end on the seabed, the device comprising an outboard connecting part being adapted to connect with the pipeline end and lowered from the surface towards a landing structure on the seabed or alternatively lifted from the landing structure on the seabed towards the sea surface. The outboard connecting part comprising a pair of guide funnels adapted to engage with a pair of corresponding guideposts arranged on the landing structure. The invention is distinctive in that the connecting device comprising at least one fin is arranged between the pair of guide funnels, said at least one fin is adapted to bear against the landing structure, said pair of guide funnels are adapted to bear against the corresponding pair of guideposts, the said at least one fin and guide funnels are configured to interact and positioning the outboard connecting part when relative to the landing structure.

This provides a device where the pipeline and especially a flexible pipeline can be deployed at the seabed before the inboard connecting part.

Preferably said pair of guide funnels are adapted to bear against a small portion of the corresponding pair of guideposts when the outboard connecting part is resting on the landing structure.

In another preferable embodiment of the invention the at least one fin is situated between the pair of funnels and adapted to bear against an edge on the landing structure.

In yet another preferable embodiment of the invention the funnels is shaped as a frustum of a pyramid or a cone with a first wide end and a second, narrow end.

In another preferable embodiment of the invention, each of the funnels have extension plate arranged in connection with the funnel at the second, narrow end of said funnel.

In another preferable embodiment of the invention, the height of the extension plate is less than 3× diameter of said guide post. This provides an easier mating of the guideposts and the funnels.

In yet another preferable embodiment of the invention, said funnel frame is slidably connected to the connecting frame. The connection frame is adapted to be moved towards the inboard connecting part while the funnel frame are at rest on the landing structure.

In another preferable embodiment of the invention, a center guide is extending from the connecting frame through a channel in the funnel frame.

In another preferred embodiment of the invention the center guide adapted to bend in the free end.

This provides a dampening of the outboard connection when the outboard connection lands on the landing structure.

In yet another preferable embodiment of the invention a pair of side rails are extending from the connecting frame through rail guides attached to the funnel frame.

This provides an additional support and dampening of the outboard connection device when the outboard connection device lands on the landing structure.

In another embodiment of the invention there is a clearance between the side rails and the rail guides. The clearance provides a movement between the funnel frame and the connection frame and a boundary for the movement.

In another embodiment of the invention the at least one guidepost is arranged perpendicular in relation to a landing frame of the landing structure, said landing frame is configured to be inclined relative to the seabed, when said landing structure is resting on the seabed.

In another preferred embodiment of the invention there ere are arranged at least two guideposts spaced apart on the landing frame, said distance between the guidepost equals the center distance between the funnels arranged on the outboard connecting part.

In yet another preferred embodiment according to the invention, the guideposts have different lengths.

BRIEF DESCRIPTION OF THE DRAWINGS

Having described the main features of the invention above, a more detailed and non-limiting description of an exemplary embodiment will be given in the following with reference to the drawings.

DETAILED DESCRIPTION OF THE INVENTION

Figure 1:
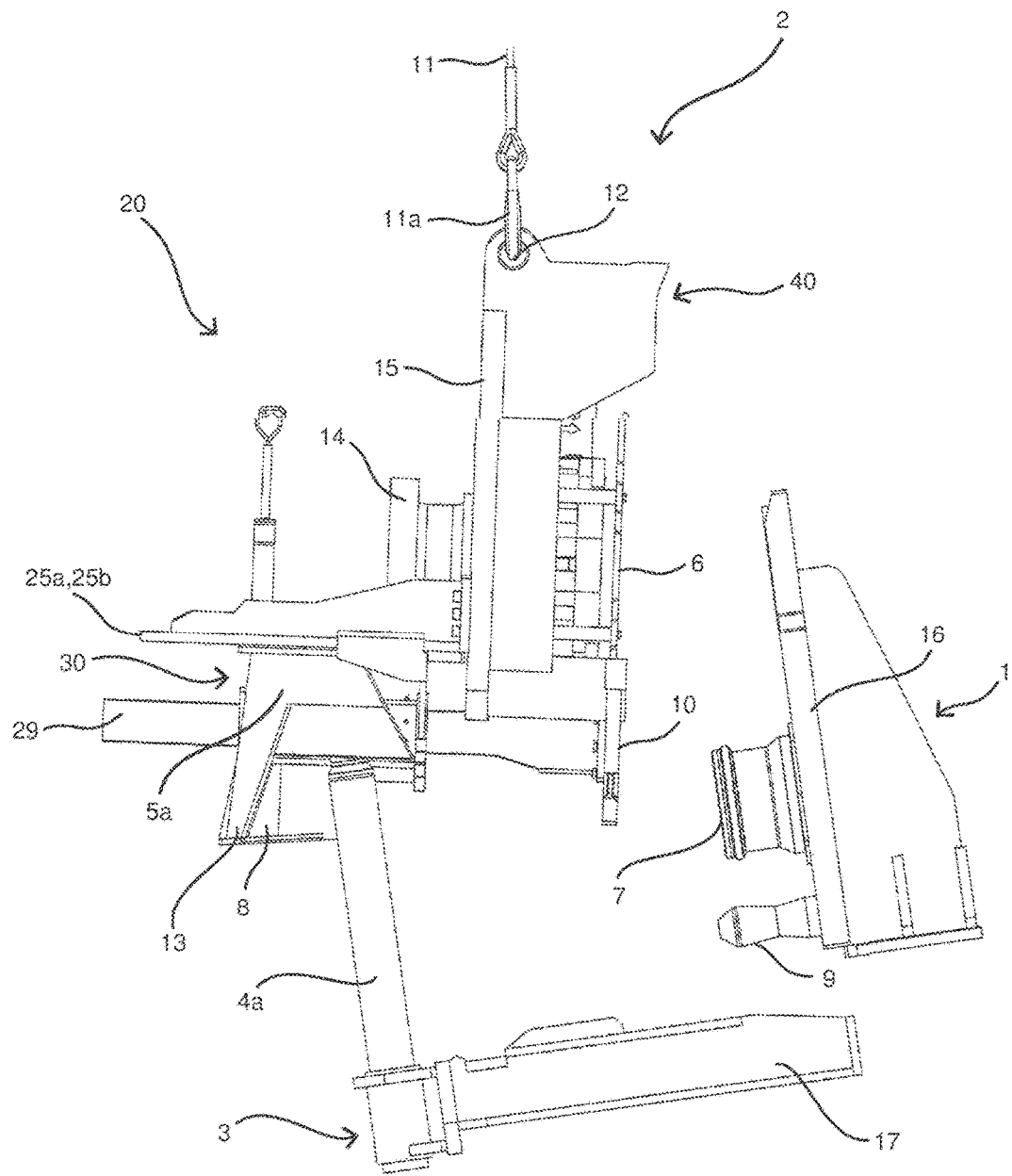
FIG. 1 shows a connector device according to the present invention, viewed schematically from the side.

In general, it will be understood that such terms as "up", "down", "vertical", "horizontal" and the like, are made with reference to the drawings and/or the earth and that the device may not be arranged in such positions at all times depending on variations in operation, transportation, mounting and the like Other and further objects, features and advantages will appear from the following description of preferred embodiments of the invention, which is given for the purpose of the description, and given in context with the appended drawings where:

FIG. 1 shows a complete connecting device 20, assembled by a first connecting part 1, hereinafter called inboard connecting part 1, a second connecting part 2, hereinafter called outboard connecting part 2 and a landing structure 3.

The inboard connection part 1 is shown in FIG. 1 as an illustration of the principle of use. It is according to the invention not necessary that the inboard connecting part 1 are installed at the seabed before the outboard connecting part 2 is lowered to the landing structure 3 at the seabed. The outboard connection part 2 is independent of the inboard connection part 1. The outboard connecting part 3 could be placed on the landing structure 3 at the seabed before the inboard connecting part 1 is installed on the seabed.

The connecting device 20 is developed to perform mating and connection of a first pipeline 21 (shown in FIG. 8) and a second pipeline or other subsea arrangements arranged on the seabed (not shown). The figure shows the connecting device 20 in a position where the outboard connecting part 2 is lowered down to the landing structure 3 and the inboard connecting part 1 at the seabed, viewed from the side.

The inboard connecting part 1 is adapted to be secured to the second pipeline (not shown) or a subsea structure (not shown), such as a manifold structure or an x-tree structure etc. through a connection point. The inboard connecting part 1 and the outboard connection part 2 are connecting the first pipeline 21 and the second pipeline (not shown) or subsea structure together through an inboard hub 7 and an outboard hub 14. The inboard connecting part 1 is stationary relative to the subsea structure.

The landing structure 3 is located adjacent the inboard connecting part 1 or in connection with the inboard connecting part 1. The landing structure 3 could also be installed at the seabed before the inboard connecting part 1 as mentioned above. The landing structure 3 act as a support for the outboard connecting part 2 when it is deployed at the seabed.

Figure 3:
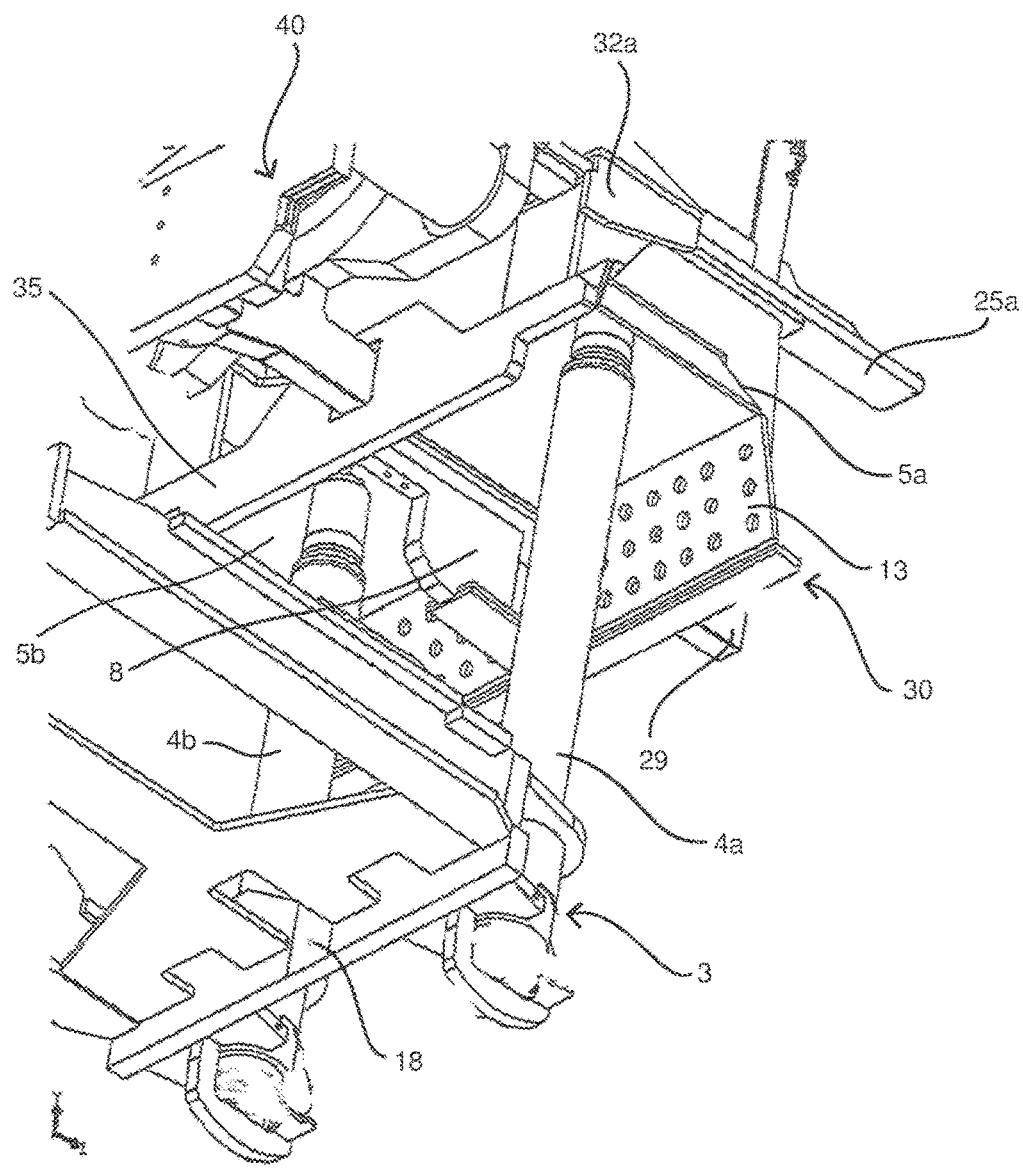
FIG. 3 shows a detail view of the funnels and fin of the outboard connecting part, viewed from the below.

The landing structure having two guideposts 4a, 4b arranged on the end of the landing structure 3 facing away from the inboard connecting part 1. (Both guideposts are shown in FIG. 3) The guideposts 4a, 4b are spaced apart on a robust and rigid frame structure 17. The guideposts 4a, 4b are extending upwards substantially perpendicular to the frame structure 3.

The outboard connecting part 2 is adapted to be connected to a pipeline end 21a (FIG. 11) of the first pipeline 21 at the sea surface, on for instance a vessel and the outboard connecting part 2, is then lowered to the seabed to the landing structure 3.

The outboard connecting part 2 comprises a connecting frame 40 and a funnel frame 30. These parts are slidably connected to each other.

The connecting frame 40 of the outboard connecting part 2 has a vertically aligned reaction plate 15 with an opening where an outboard hub 14 is attached. The pipeline 21 is adapted to be connected to the reaction plate 15 via the outboard hub 14. The reaction plate 15 distributes the forces between the structure, i.e. pipeline or subsea structure and the outboard hub 14.

A clamp connector 6 is arranged at the opposite side of the reaction plate 15 at the side facing the inboard connecting part 1, when positioned at the seabed. The clamp connector 6 is adapted to clamp or connect the outboard hub 14 with the first pipeline 21 which are attached to the outboard connecting part 2 together with an inboard hub 7 arranged on the inboard connecting part 1. The inboard hub 7 of the inboard connecting part 1 is arranged on a vertically aligned reaction plate 16 and is adapted to be connected to a pipeline or a connection point of a subsea structure arranged on the seabed (not shown) at the opposite end of the inboard connection part 1.

At the lower part of the inboard connecting part 1, there are arranged alignment rods 9. The alignment rods 9 being able to receive alignment cylinders 10 arranged on the outboard connecting part 2 when the outboard connecting part 2 is moved towards the inboard connecting part 1 after the outboard connecting part 2 has landed on the landing structure 3.

Figure 10:
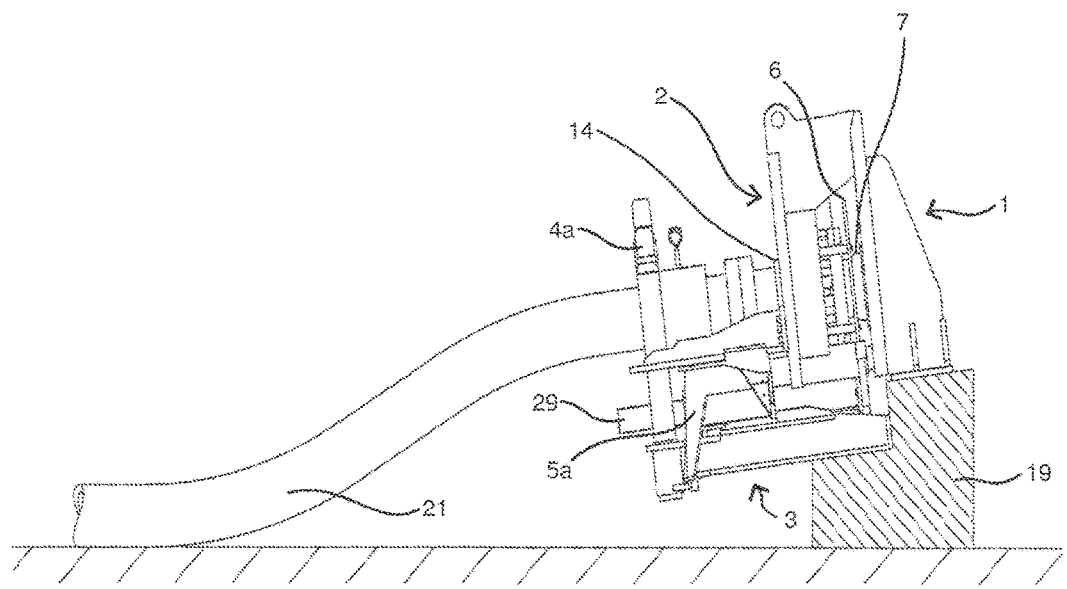

The landing structure 3 are positioned on the seabed with a slight inclination relative to the seabed, shown in the Figures. In FIG. 10 this inclination between the landing structure and the seabed is shown in greater detail. The pipeline attached to the outboard connecting part has a minimum break in the pipeline the more the downwardly inclination is. The load acting from the pipeline acting on the outboard connecting part 2 is reduced because more of the pipeline is arranged on the seabed.

The inboard connection part 2 could also preferably be arranged inclined in relation to the seabed.

It is also an embodiment of the invention that the landing structure are arranged in substantially the same horizontal plane as the seabed but in this embodiment more of the pipeline is arranged above the seabed and the load of the pipeline is thus increased compared to the embodiment with the inclined landing structure 3.

The reaction plate 15 and the guideposts 4a, 4b are substantially perpendicular to this inclined plane. This makes it easier for the funnels 5a, 5b to engage with the guidepost 4a, 4b when the outboard connecting part 2 is mating with the guidepost 4a, 4b.

The outboard connecting part 2 is suspended from wires 11 attached to hooks 11a. The hooks 11a are adapted to engage in holes or eyes 12 in the top part of the connecting frame 40 when the outboard connecting part 2 is lowered down to the seabed towards the guideposts 4a, 4b.

The funnel frame 30 of the outboard connecting part 2, is shown in detail in FIG. 2 where the funnel frame 30 is viewed from below.

Figure 2:
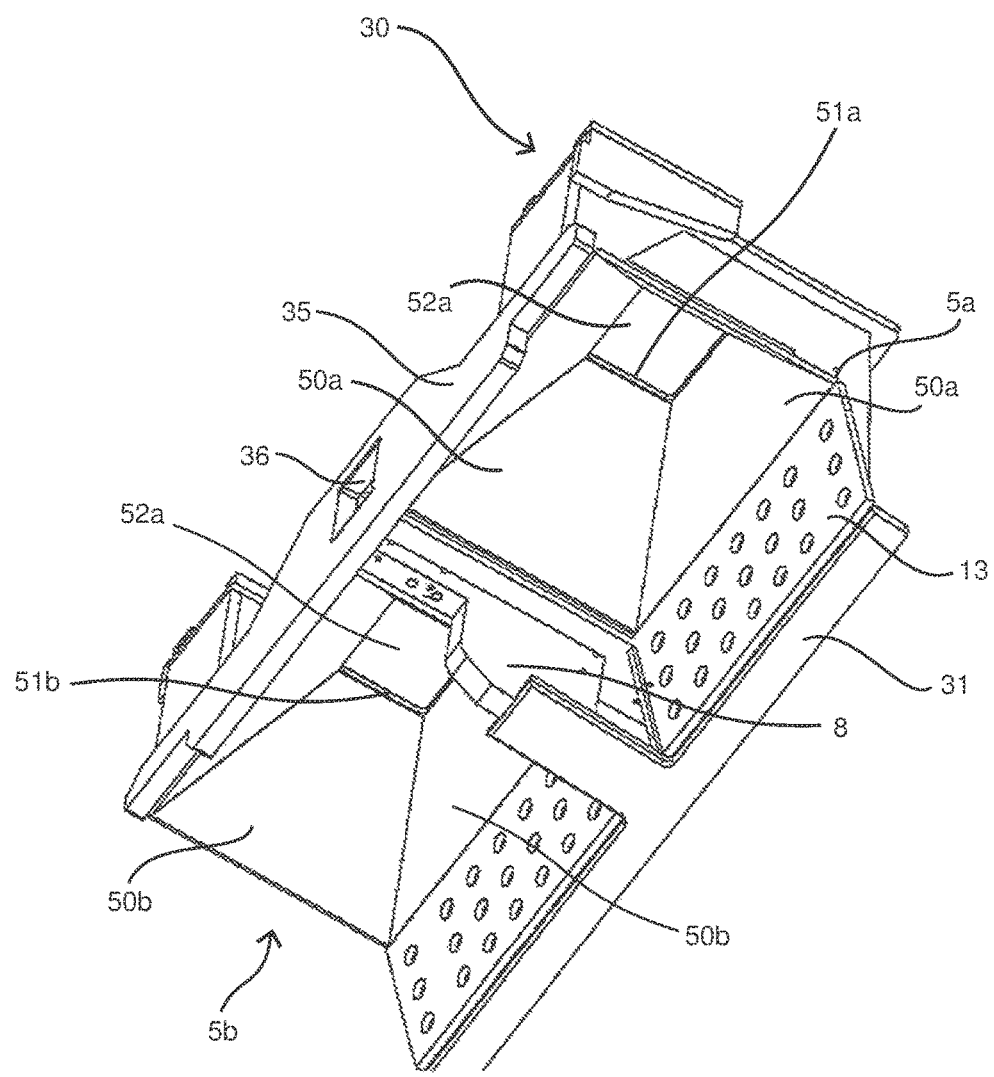
FIG. 2 shows a detail view of the funnel frame, viewed from below.

As shown in FIG. 2, there are arranged two funnels 5a, 5b juxtaposed or beside each other in the funnel frame 30.

Each of the funnels 5a, 5b has the shape of a frustum of a pyramid with a first wide opening end facing downwardly towards the seabed and a second, narrow opening end, facing upwardly towards the sea surface.

At least one of the four sides 50a, 50b is arranged sloping from the wide end facing the seabed towards the narrow end 52 having a smaller rectangular or square shape 51a, 51b.

At the narrow side of the funnels 5a, 5b there is a small prism-shaped extension plate 51a, 51b.

The guide funnels could optionally also have a shape as a cone with a wide end and a narrow end. In this embodiment the extension plate 51a, 51b on the narrow end having a cylindrical shape.

The extension plate is indicated by reference mark 51a, 51b in FIG. 2 and is here shaped as a rectangular extension or a cylindrical extension with a small height around the narrow rectangular or cylindrical opening at the narrow end 52a, 52b of the funnels 5a, 5b. All sides of the rectangular or cylindrical extension plate is of equal height from the funnel 5a, 5b. The height of the extension plate 51a, 51 is preferably less than 3× diameter of the guidepost 4a, 4b and makes it easier for the guidepost 4a, 4b to mate with the funnels 5a, 5b when the outboard connecting part 2 is lowered down to the landing structure 3, especially when the outboard connecting part 2 is engaging with the funnels (5a, 5b) at different angles.

The height of the extension plate 51a, 51b could be as small as practically possible to make it easier for the guide post 4a, 4b to mate with the funnels 5a, 5b.

The FIG. 2 also shows a fin 8 situated between the guide funnels 5a, 5b. This fin 8 is extending downwardly from the funnel frame 30. The fin 8 is adapted to abut an edge 18 in the landing structure 3 when the outboard connecting part 2 is brought down to the landing structure 3. This will be further described in FIG. 7.

A perforated plate 13 is extending downward from each of the funnels 5a, 5b at the sides 50a, 50b of the funnels 5a, 5b arranged on the funnel frame 30 side of the outboard connecting part 2. A t-shaped beam 31 could be arranged beneath and in contact with the perforated plate 13 and the fin 8.

The fin 8 is adapted to stop forward motion or backward tilting of the outboard connecting part 2 when it is resting on the landing structure 3. This will be further described below.

The funnel frame 30 further comprises a support plate 35 arranged on the opposite side of the funnels relative to the perforated plate 13. The support plate 35 having an opening 36 and a channel 37 (FIG. 4a) arranged between the guide funnels 5a, 5b, adapted to receive a center guide 29 (shown in FIG. 1). The center guide 29 is connected to the connecting part 40 and slidably connected to the funnel frame 30 through the opening 36 and channel 37.

FIG. 3 shows the initial position where the outboard connecting part 2 is lowered on the landing structure 3. The Figure shows the connecting frame 40 and the funnel frame 30 in greater detail.

The funnels 5a, 5b are attached to or an integrated part of the funnel frame 30 are engaging the top of the respective guideposts 4a, 4b attached to the landing structure 3.

The fin 8 is situated below the funnels 5a, 5b in a position between the funnels 5a, 5b. The fin 8 is attached to the funnel frame 30.

The fin 8 could be bolted to the funnel, welded or attached in other ways to the funnel frame 30. The fin 8 could also have other arrangement or positions on the funnel frame 30 suitable for supporting the outboard connecting part 2 on the landing structure 3.

The landing structure has an edge 18 (see FIGS. 3, 4b, 4c, 6, 7) arranged between the guideposts 4a, 4b. The fin 8 and the edge 18 is substantially aligned in the vertically direction so that the fin 8 is abutting the edge 18 when the outboard connecting part 2 is resting on the landing structure 3. This is shown in FIG. 7.

The funnel frame 30 is adapted to move in the substantially horizontal direction relative to the connecting frame 40 in a sliding connection.

As described above one of the sliding connections between the funnel frame 30 and the connecting frame 40, is the center guide 29, which is extending through a channel 37 attached to the funnel frame 30.

Figure 4A:
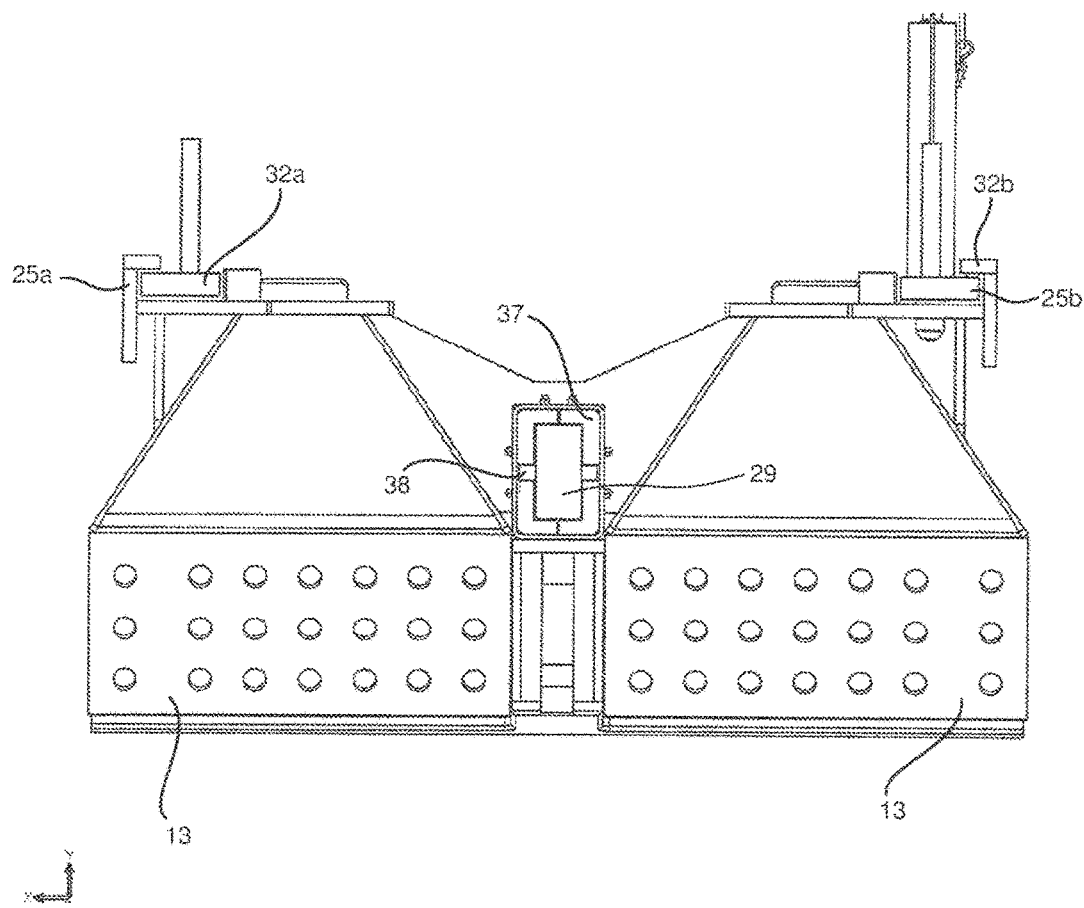
FIG. 4a shows a detail view of the funnel with center and side rails, seen from behind.

In addition to this, the connecting frame 40 has a pair of side rails 25a, 25b (see FIGS. 1, 4a extending substantially horizontally from the connecting frame 40 parallel to the center guide rail 29. The side rails 25a, 25b and the center guide 29 are extending in planes perpendicular to the outboard reaction plate 15.

The side rails 25a, 25b and the center guide 29 are extending from different planes as shown in particular in FIG. 4. The center guide 29 is situated below the side rails 25a, 25b.

The funnel frame 30 has corresponding rail guides 32a, 32b (see FIGS. 1, 5) enclosing the side rail 25a, 25b. This provides a second and third sliding connection between the funnel frame 30 and the connecting frame 40.

The side rails 25a, 25b and the connection with the rail guide 32a, 32b are shown in detail in FIG. 4. The center guide 29 and channel 37 are also shown in this Figure. The funnel frame 30 is in this Figure viewed from behind.

The center guide 29 is attached to the connecting frame 40. The center guide 29 is bolted to the connecting frame 40. The center guide 29 is extending through the channel 37. The center guide 29 and the channel has similar shape so that the center guide 29 fits in the channel. The center guide rail 29 is extending to a free end at the opposite side. The center guide 29 could act as a resilient member since the free end is adapted to bend approximately 10 mm in each direction. This is advantageous when the outboard connecting part 2 is mating with the landing structure 3 to mitigate the connection. There are also The funnel frame 30 is slidably connected to the center guide 29 and the connecting frame 40.

When the outboard connecting part 2 is lowered down to the landing structure 3, the funnel frame 30 is arranged near the free end of the center guide 29. This gives a little flexibility between the funnel frame 30 and the connecting frame 40, because it is possible for the center guide 29 to bend slightly in either direction. There is arranged spacers 38 within the channel 37. These are preferably made of plastic and are situated in the opening between the center guide 29 and the channel to prevent the center guide 29 from touching the sides of the channel and damage the center guide 29 or the channel 37. The center guide 29 will as described above also function as a damper when the funnels 5a, 5b of the outboard connecting part 2 are engaging the guidepost 4a, 4b and especially when the outboard connecting part 2 is landed on the landing structure 3.

The guide rail 29 is adapted to bend approximately 10 mm to the sides as well as up and down.

Figure 4B:
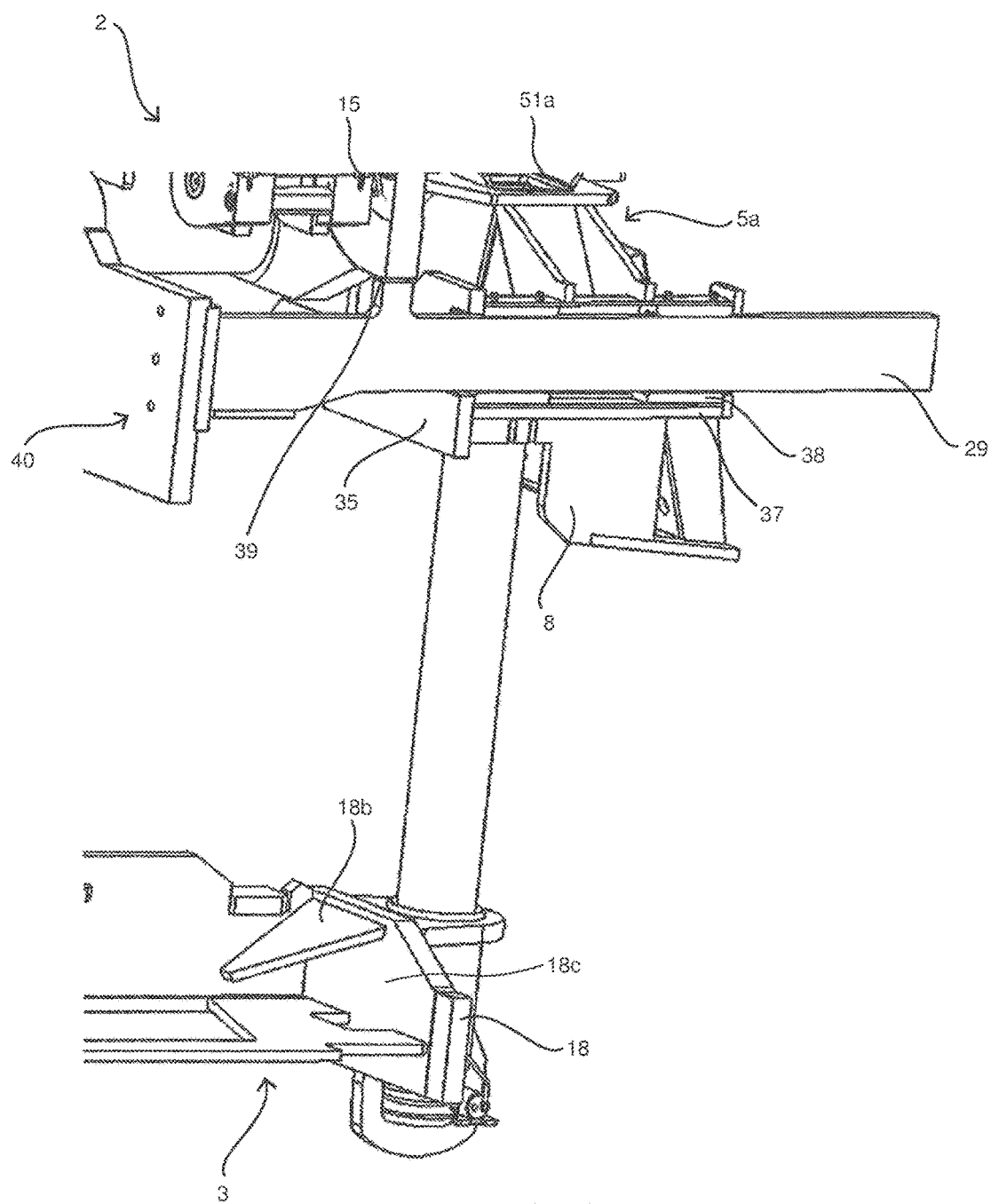
FIG. 4b shows a detail view of the outboard connecting part in an initial mating position with the landing structure.
Figure 4C:
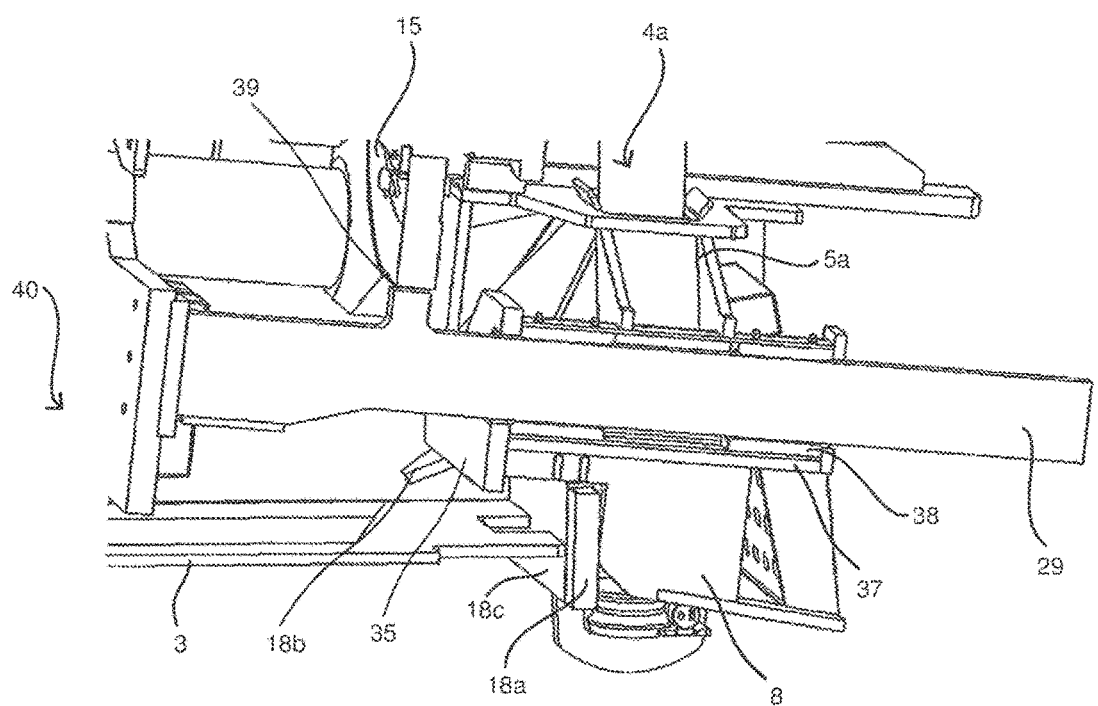
FIG. 4c shows a detail view of the outboard connecting part in resting position on the landing structure.

There is also a gap 39 between the center guide 29 and the reaction plate 15 to reduce the impact on the reaction plate 15 when the outboard connecting part 2 is landing on the landing structure 3. This is shown in FIG. 4b in the initial mating position and also in FIG. 4c in the resting position where the outboard connecting part 2 are arranged on the landing structure 3.

The figures also show at least one resting plate 18b arranged on the landing structure 3, which is adapted to receive the support plate 35. The resting plate 18b is inclined downwards from an end plate 18c integrated on the landing structure 3. The end plate 18c is arranged as an extension of the edge on both sides of the edge 18a, connecting the guidepost 4a, 4b together. The at least one resting plate 18b gives an additional support to the outboard connecting plate 2 in the resting position. This also prevent the outboard connecting part 2 from tilting. When landed on the landing structure 3. This resting plate 18b arranged on the end plate 18c, or alternatively a multiple of plates, are optional embodiments of the invention.

The side rails 25a, 25b are situated in a plane above the center guide 29, as shown in FIG. 4a.

The side rails 25a, 25b are extending from the outboard reaction plate 15 through rail guide 32a, 32b in the upper part of the funnel frame 30, as shown in FIG. 4a. There is a clearance between the side rails 25a, 25b and the rail guide 32a, 32b to allow some movement between the funnel frame 30 and the connecting frame 40. The clearance between the side rails 25a, 25b and the rail guide 32a, 32b could be about 10 mm, which are the same as the allowed movement of center guide 29.

The side rails 32a, 32b can thus act as an end stopper for the movement of the center guide 29.

There could also be a small clearance between the channel 37 and the center guide 29 to allow small movement of the center guide 29 in the channel to reduce impact when the outboard connection part is lowered down to the landing structure 3.

Figure 5:
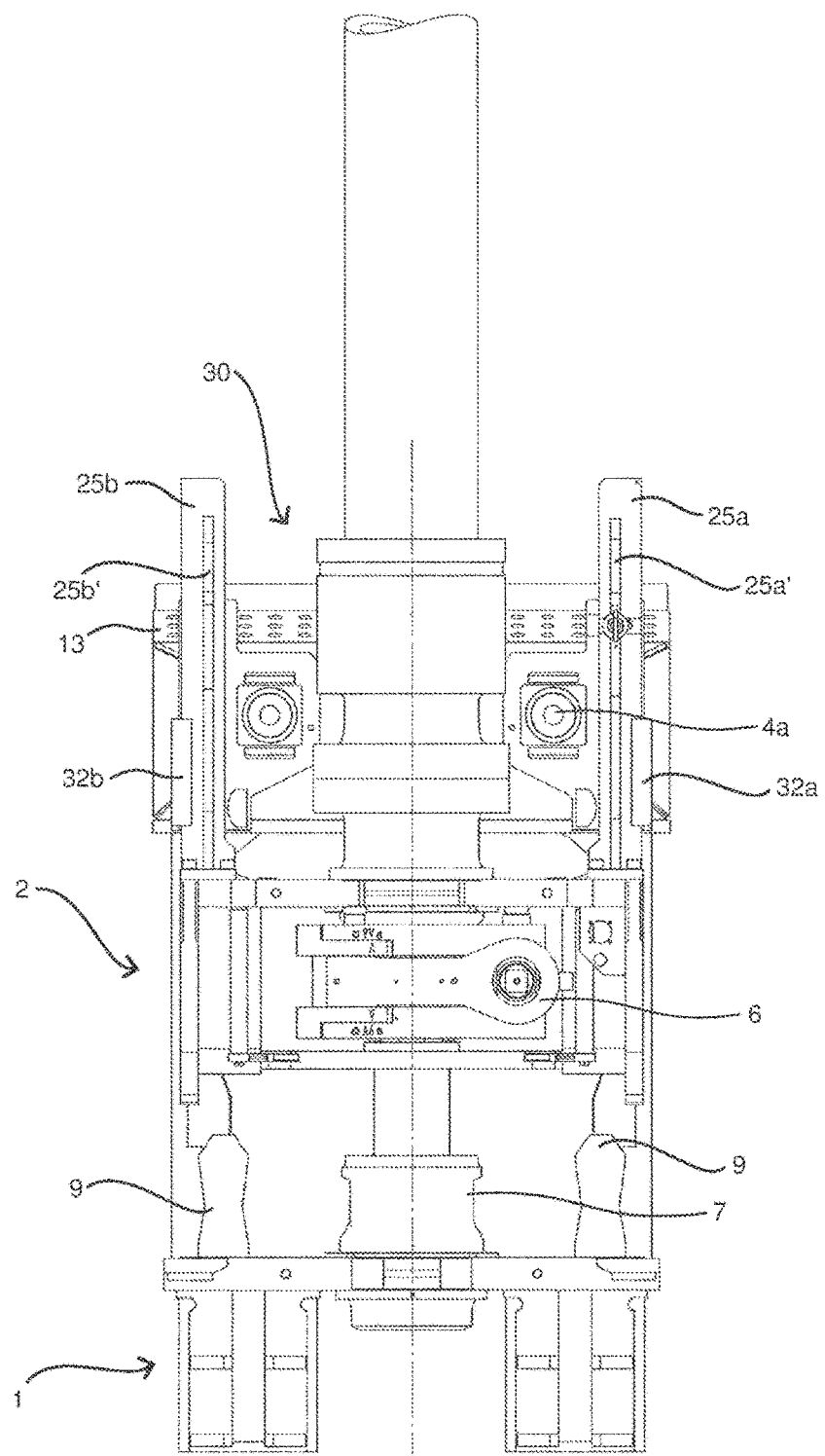
FIG. 5 shows the outboard connecting part and the guidepost attached to the landing structure according to the present invention, viewed from above.

FIG. 5 shows the outboard connecting part 2 from FIG. 1, topside view. In this figure, the side rails 25a, 25b have slots 25a' 25b' as an optional embodiment. A protrusion 33a connected to the funnel frame 30 is arranged in the slot 25a' to guide the direction of movement of the between the funnel frame 30 and connecting frame 40. The figure shows one protrusion 33a, but there could optionally be more than one protrusion, coupled to both of the side rails 25a, 25b. There could optionally be only one protrusions 33a.

The protrusion act as an end stopper for the movement of the funnel frame 30 and the connecting frame 40 in relation to each other.

Figure 6:
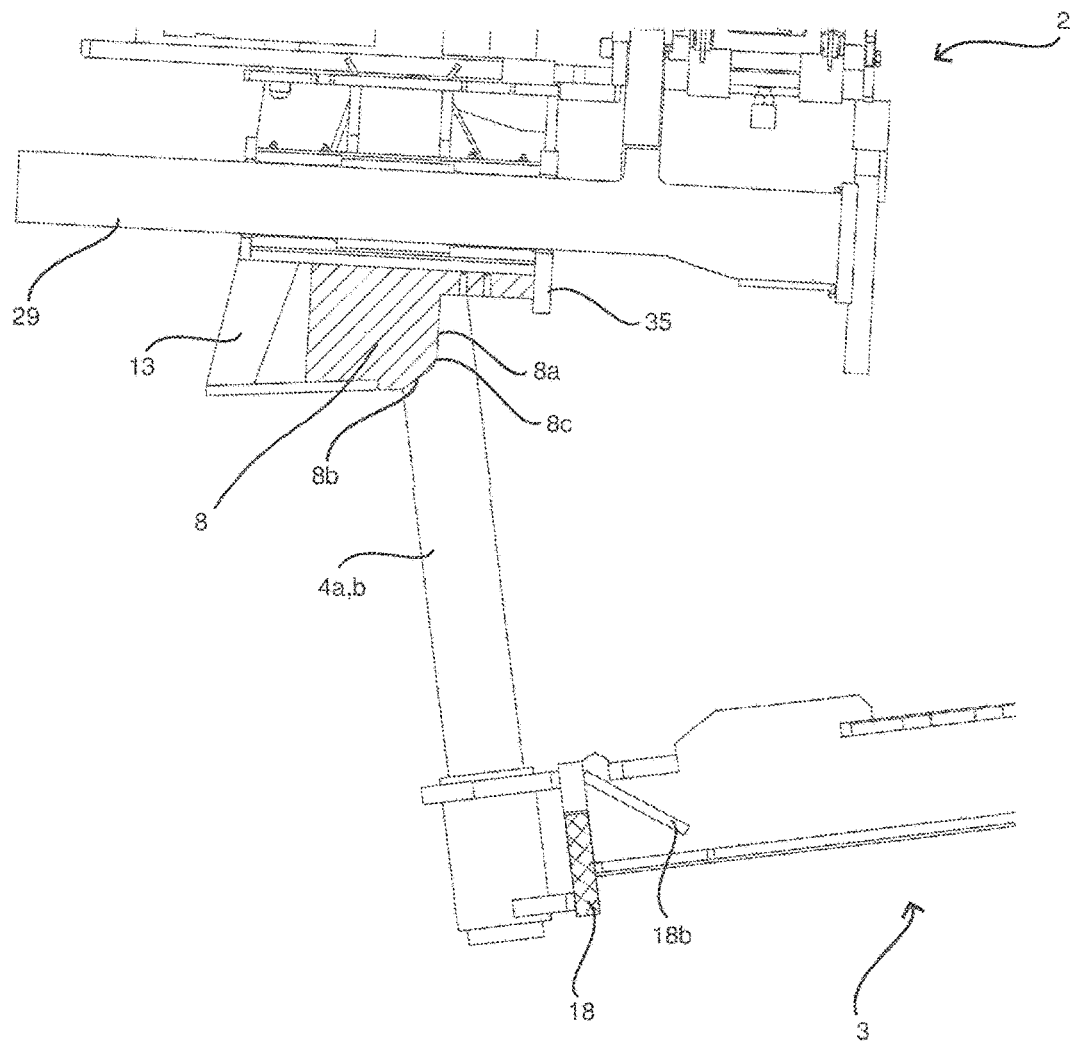
FIG. 6 shows a sectional view of the outboard connecting part according to the invention in an initial mating position with the guideposts on the landing structure, viewed from the side.
Figure 7:
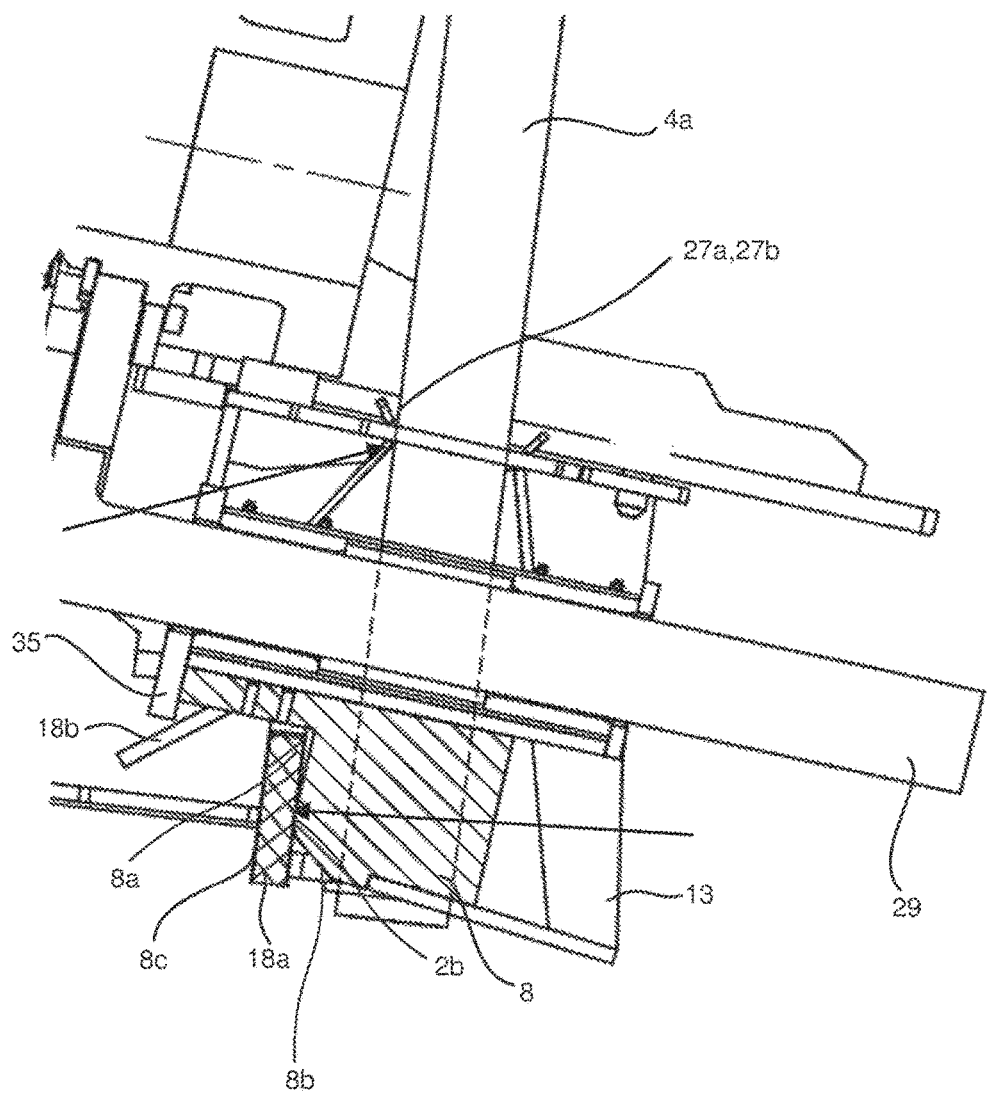
FIG. 7 shows a sectional view of the outboard connecting part according to the invention in a resting position on the landing structure, viewed from the side. The fin is abutting an edge on the landing structure.

FIG. 6 shows the position and the shape of the fin 8 and the edge 18 in the initial mating position of the outboard connecting part 2, viewed from the side. The fin 8 and the edge 18a are shown in bold.

FIG. 7 shows the outboard connecting part 2 resting on the landing structure 3. In this position, there are three points 26, 27a, 27b of contact between the outboard connecting part 2 and the landing structure 3. These points 26, 27a, 27b of contact makes it possible for the outboard connecting part 2 to rest on the landing structure 3 before connecting to the inboard connecting part 1. In addition, the support plate 35 could be resting on the edge 18a, also to prevent the outboard connection part 2 from tipping.

A first point 26 of contact between the fin 8 and the edge 18a.

A second point 27a of contact arranged between the guidepost 4a and the funnel 5a and a third point of contact arranged between the guidepost 4b and the funnel 5b. The point of contact is on the extension plate of the funnel 51a, 51b (shown in FIG. 2).

The fin 8 could have a rounded surface 8a at the corner facing the edge 18, or a shape as a shortened edge with sides 8a, 8b which meets in a tip 8c.

This tip 8c is abutting the edge 18 in the resting position of the outboard connecting part 2. The outboard connecting part 2 is thus prevented from tipping. Others shapes of the fin is also possible embodiments of the invention.

There is no mechanical coupling between the landing structure 3 and the outboard connecting part 2 in the resting position.

The fin could also have other shapes suitable for resting on the landing structure 3.

Figure 8:
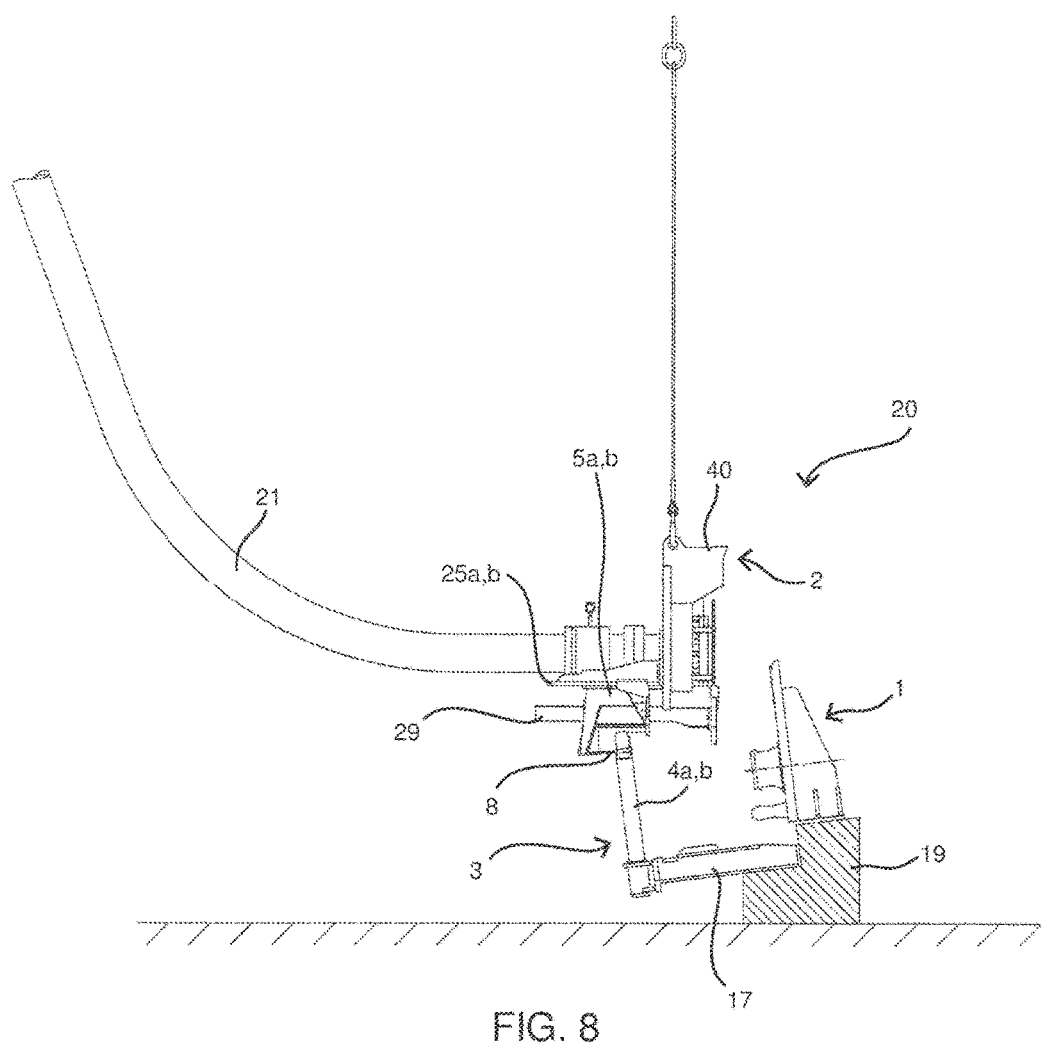
FIG. 8-FIG. 10 shows the different steps of the lowering of the outboard connecting parts together with the pipeline end towards the resting position on the landing structure arranged on the seabed.
Figure 9:
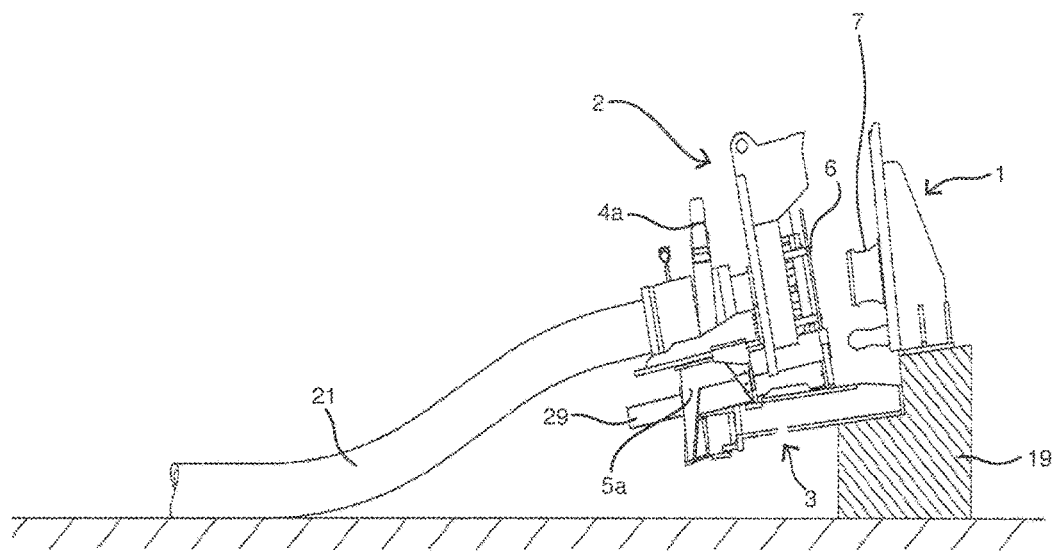

The following FIGS. 8-10 shows the lowering of the of the outboard connecting part 2 to the landing structure and the connection of the outboard connecting part 2 to the inboard connecting part 1.

The FIGS. 8-10 show the inboard connection part 1 arranged at the seabed before lowering of the outboard connection part but this is not mandatory. The inboard connection part can be deployed at the seabed after the deployment of the outboard connection part 2.

FIG. 8 shows the outboard connecting part 2 in an initial mating position above the landing structure 3. The guideposts 4 are substantially aligned perpendicularly to the frame structure 17 below the funnels 5 and are adapted to engage with the funnels 5a, 5b.

When the outboard connecting part 2 is lowered down to the landing structure 3 by the wires 11, there could be a slight movement or rotation of the outboard connecting part 2 due to movement of the vessel, ie from which the outboard connecting part 2 is lowered. When the first end of the pipeline is lowered down this angle could be controlled by the ratio between the lowering of the outboard connecting part 2 and lowering of the pipeline. The speed of the lowering of the wire could and the speed of the lowering of the pipeline could be controlled independently to have different inclination of the outboard connecting part 2 relative the seabed.

The two guideposts 4a, 4b are arranged substantially perpendicular to the landing structure 3. The optimal mating position is when the outboard connecting part 2 are lowered with the same inclination relative the seabed as the landing structure 3.

The guidepost 4a and the guidepost 4b could be of equal length or there could be a difference in length between the guidepost 4a and guidepost 4b. These being optionally embodiments of the invention.

A difference in the length between the guidepost 4a and guidepost 4b makes it easier for the outboard connecting part 2 to engage with the landing structure 3 The guidepost 4a is longer than the guidepost 4b (not shown). There could be a difference in length between the guidepost 4a and guidepost 4b. This makes it easier for the outboard connecting part 2 to position the outboard connecting part 2 and engage with the guidepost 4a, 4b on the landing structure 3. The short prism-shaped or cylindrical extensions plates 51a, 51b from the narrow side of the frustum make it also easier for the guidepost 4a, 4b and the funnels 5a, 5b to mate.

The guidepost 4a, 4b could optionally have equal length, this being an embodiment of the invention.

The outboard connecting part 2 is guided further down on the guidepost 4a, 4b until it rests on the landing structure 3. In this resting position, there is a gap 39 or distance between the inboard hub 7 at the inboard connecting part 1 and the clamping connector 6 at the outboard connecting part 2. This is illustrated in FIG. 9.

A stroke tool (not shown) is adapted to be arranged with one end in a stroke tool slot 23 arranged in the reaction plate 16 of the inboard connecting part 1. The other end is arranged in a similar slot 24 in the reaction plate 15 on the connection frame 40 of the outboard connecting part 2. When the stroke tool is activated, the connection frame 40 of the outboard connecting part 2 and the inboard connecting part 1 will be pulled together. The funnel frame 30 is held in a steady position because of the engagement between the guideposts 4a, 4b and funnels 5a, 5b. The slidably connection between the funnel frame 30 and the connection frame 40 allows the connection frame 40 with the pipeline 21 to move away from the funnel frame 30. The connection frame 40 will move towards the inboard hub 1.

FIG. 10 shows the inboard hub 7 of the inboard connecting part 1 and the outboard hub 14 of the outboard connecting part 2 connected to each other through the clamp connector 6.

Figure 11:
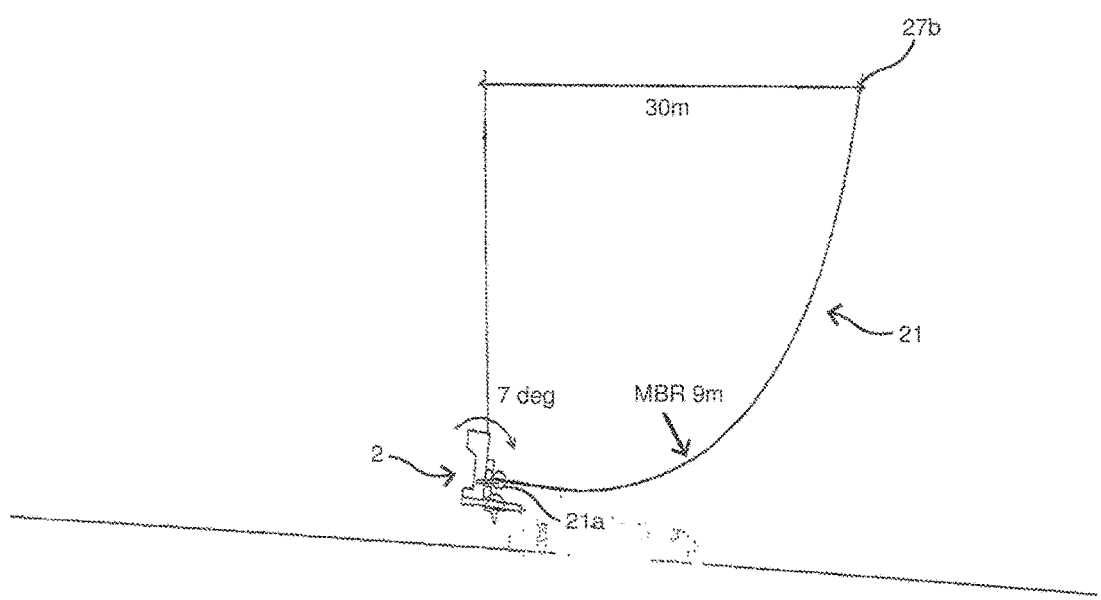
FIG. 11 shows a principle sketch of the lowering of the outboard connecting part with a flexible pipeline attached.

FIG. 11 shows schematically the lowering of the outboard connecting part 2 to the seabed. The Figure shows that the first end 21*a* of the attached pipeline 21 that is lowered to the seabed. The other end of the pipeline is arranged on the vessel, platform or similar device at the water surface (not shown). The outboard connecting part 2 will therefore only carry a part of the weight of the pipeline when the connecting part 1 is lowered to the seabed.

The present invention has been described with reference to a preferred embodiment and some drawings for the sake of understanding only and it should be clear to persons skilled in the art that the present invention includes all legitimate modifications within the ambit of what has been described hereinbefore and claimed in the appended claims.

The invention claimed is:

1. An outboard connecting device for landing or retrieving a first pipeline end on the seabed and configured to connect with an inboard connecting device having a second pipeline end or subsea structure arranged at the seabed, said outboard connection device configured to be lowered from the sea surface towards a landing structure arranged on the seabed or alternatively to be lifted from the landing structure on the seabed towards the sea surface, said landing structure being independently arranged from the inboard connecting device at the seabed, the outboard connecting device comprising:
   a funnel frame having:
      a pair of guide funnels adapted to engage with a corresponding pair of guideposts arranged on the landing structure when lowering or retrieving the outboard connecting device;
      a support plate arranged at a side of the outboard connecting device facing the landing structure and adapted to support the outboard connection device when the outboard connection device is landed on the landing structure;
      at least one fin arranged between the pair of guide funnels, the at least one fin adapted to bear against the landing structure;
      wherein the pair of guide funnels are adapted to bear against the corresponding pair of guideposts; and
      wherein the at least one fin and the pair of guide funnels are configured to interact and position the outboard connecting device independently of the inboard connecting device when the outboard connecting device is resting on the landing structure; and
   wherein the outboard connecting device comprises a connecting frame adapted to be connected to the first pipeline end, the connecting frame being slidably connected to the funnel frame for connecting the first pipeline end with the second pipeline end or subsea structure when the outboard connection device is resting on the landing structure.

2. The outboard connecting device according to claim 1, wherein each guide funnel of the pair of guide funnels is shaped as a frustum of a pyramid or a cone with a first opening and a second opening and the first opening is larger than the second opening.

3. The outboard connecting device according to claim 2, wherein each guide funnel of the pair of guide funnels has an extension plate arranged in connection with the second opening of each corresponding guide funnel.

4. The outboard connecting device according to claim 3, wherein the pair of guideposts are adapted to bear against the extension plates of the corresponding pair of guide funnels when the outboard connecting device is resting on the landing structure.

5. The outboard connecting device according to claim 4, wherein a height of the extension plate is less than 3× of a diameter of a guidepost of the pair of guideposts.

6. The outboard connecting device according to claim 1, wherein the outboard connecting device comprises a center guide extending from the connecting frame through a channel in the funnel frame.

7. The outboard connecting device according to claim 6, wherein the center guide has a free end and is adapted to bend 10 mm in each direction in the free end.

8. The outboard connecting device according to claim 1, wherein a pair of side rails extend from the connecting frame through rail guides attached to the funnel frame.

9. The outboard connecting device according to claim 8, wherein there is a clearance between the pair of side rails and the rail guides.

10. The outboard connecting device according to claim 1, wherein the pair of guideposts are arranged perpendicular in relation to a landing frame of the landing structure and the landing frame is configured to be inclined relative to the seabed when the landing structure is resting on the seabed.

11. The outboard connecting device according to claim 10, wherein the pair of guideposts are spaced apart on the landing frame a distance equal to a distance between the pair of guide funnels arranged on the outboard connecting device.

12. The outboard connecting device according to claim 1, wherein the pair of guideposts have different lengths.

* * * * *